No. 781,278. PATENTED JAN. 31, 1905.
A. B. FOWLER.
VARIABLE SPEED POWER TRANSMITTING DEVICE.
APPLICATION FILED JULY 2, 1901.
4 SHEETS—SHEET 1.
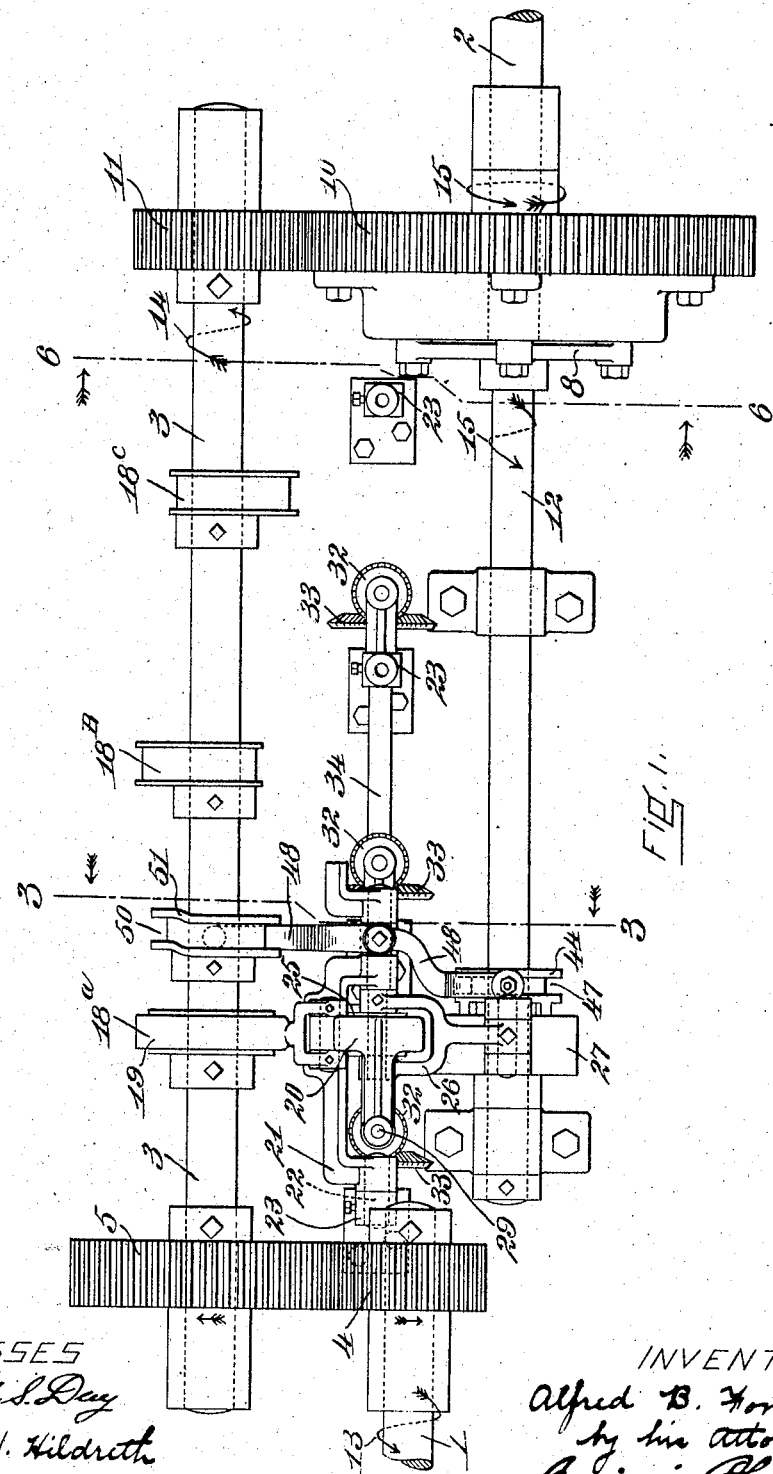
WITNESSES
Edward S. Day
Alfred H. Hildreth
INVENTOR
Alfred B. Fowler
by his attorney.
Benjamin Phillips

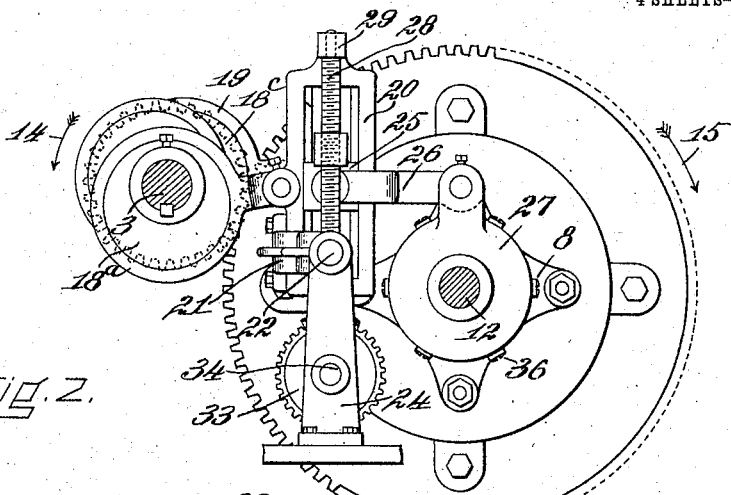
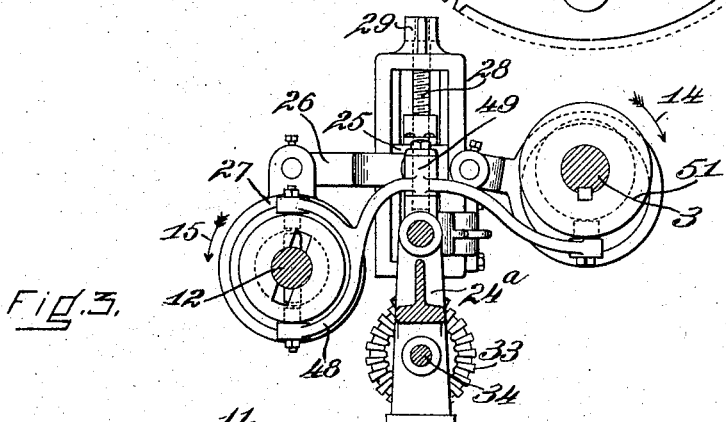
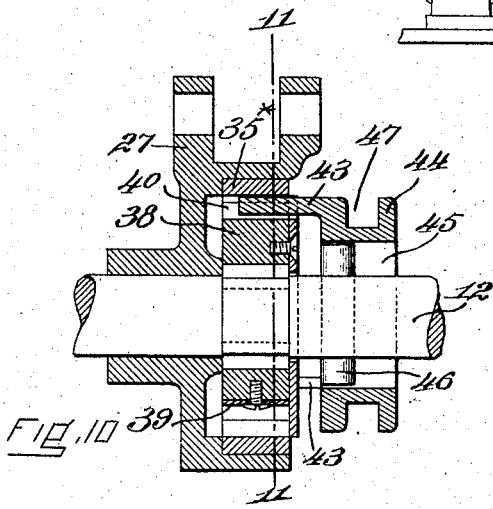
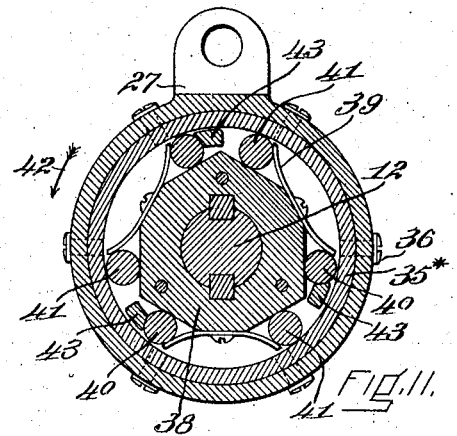

No. 781,278. PATENTED JAN. 31, 1905.
A. B. FOWLER.
VARIABLE SPEED POWER TRANSMITTING DEVICE.
APPLICATION FILED JULY 2, 1901.
4 SHEETS—SHEET 3.
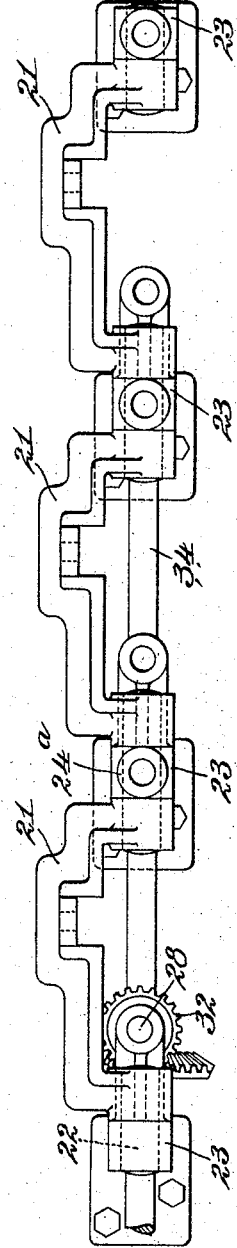
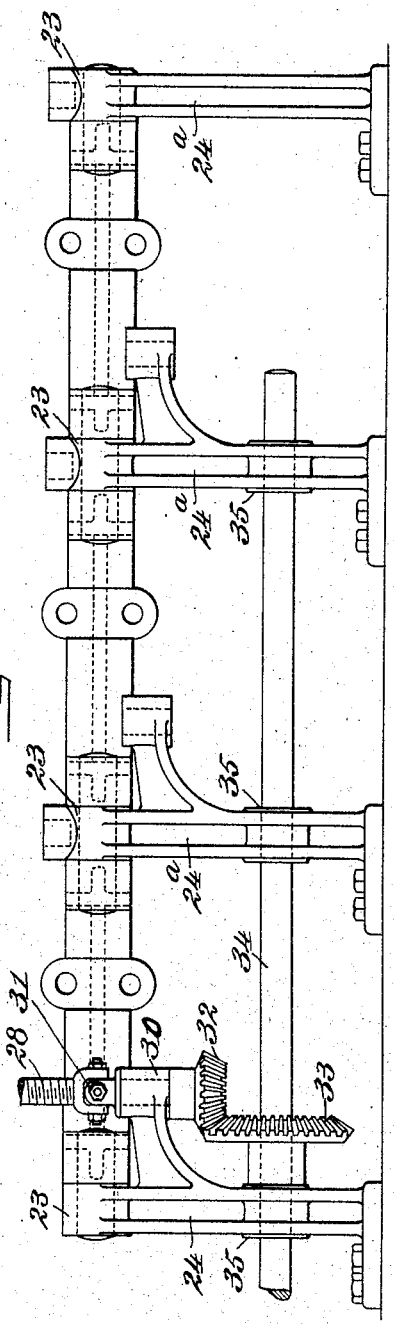
WITNESSES
Edward S. Day
Alfred H. Hildreth
INVENTOR
Alfred B. Fowler
by his attorney
Benjamin Phillips No. 781,278. PATENTED JAN. 31, 1905.
A. B. FOWLER.
VARIABLE SPEED POWER TRANSMITTING DEVICE.
APPLICATION FILED JULY 2, 1901.
4 SHEETS—SHEET 4.
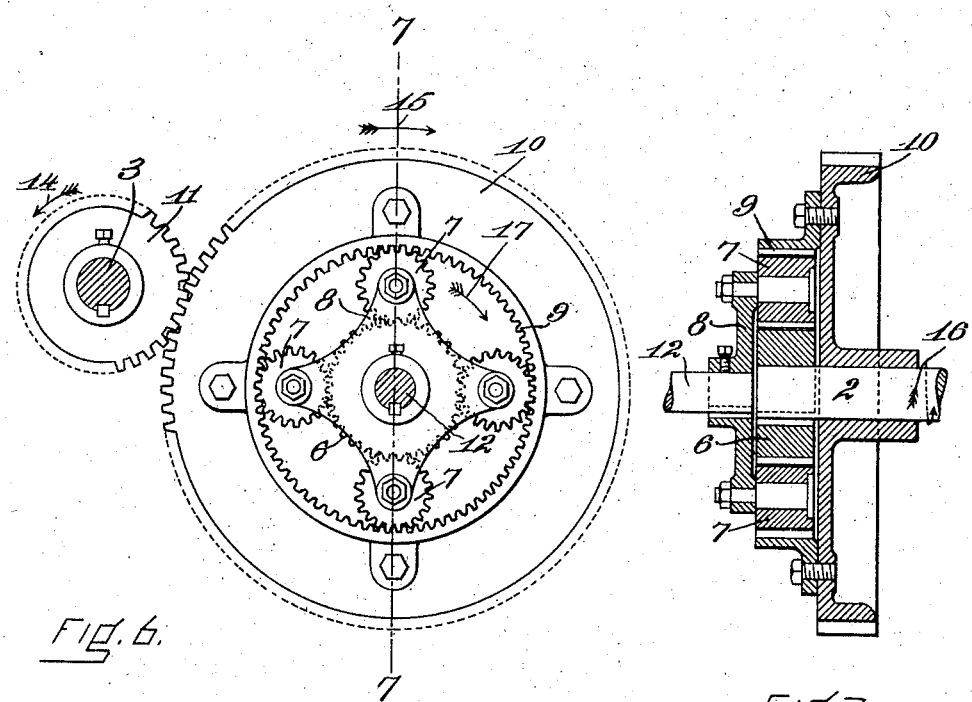
Fig. 6.
Fig. 7.
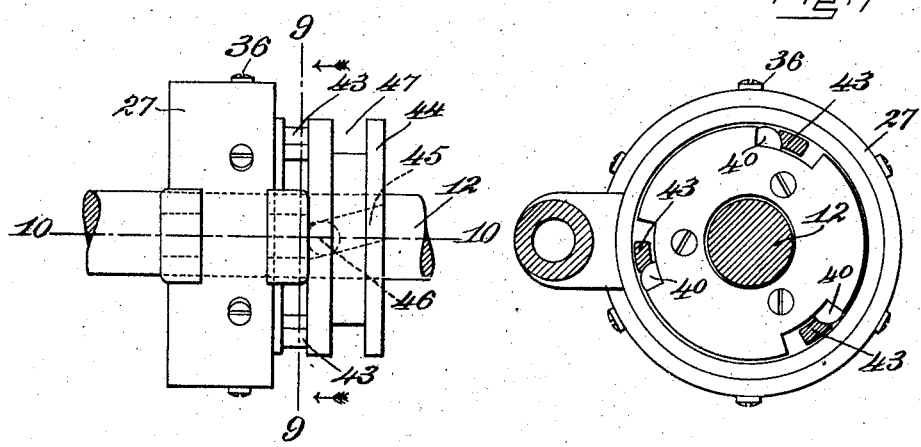
Fig. 8.
Fig. 9.
WITNESSES
Edward S. Day
Alfred H. Hildreth
INVENTOR
Alfred B. Fowler
by his attorney
Benjamin Phillips No. 781,278. Patented January 31, 1905.

UNITED STATES PATENT OFFICE.

ALFRED B. FOWLER, OF CENTRAL FALLS, RHODE ISLAND.

VARIABLE-SPEED POWER-TRANSMITTING DEVICE.

SPECIFICATION forming part of Letters Patent No. 781,278, dated January 31, 1905.

Application filed July 2, 1901. Serial No. 66,916.

*To all whom it may concern:*

Be it known that I, ALFRED B. FOWLER, a citizen of the United States, residing at Central Falls, in the county of Providence and State of Rhode Island, have invented certain new and useful Improvements in Variable-Speed Power-Transmitting Devices; and I do hereby declare the following to be a full, clear, and exact description of the invention, such as will enable others skilled in the art to which it appertains to make and use the same.

The present invention relates to an improved variable-speed power-transmitting device.

The object of my invention is to produce a device adapted to be interposed between the source of power and the driven member by virtue of which the speed of the driven member may be varied at the will of the operator.

A further object is to produce a device by which the speed of the driven member may be uniformly varied as desired—that is to say, by virtue of which the speed of the driven member may be gradually and progressively increased and decreased at will.

A further object is to embody into one device means not only for varying the speed of the driven member from zero to the maximum, but whereby the driven member may be held stationary.

A further object is to produce a device by virtue of which the speed of the driven member may be varied, brought to zero, reversed, and varied in the reverse direction.

To the above ends the present invention consists in the devices and combinations of devices hereinafter described and claimed.

In the accompanying drawings, illustrating the preferred form of my invention, Figure 1 is a plan view of the device with parts omitted. Fig. 2 is an end elevation looking toward the right-hand end of Fig. 1 with parts removed. Fig. 3 is a section on the line 3 3, Fig. 1, looking in the direction of the arrow. Fig. 4 is a plan, and Fig. 5 is an elevation, of a portion of the apparatus, illustrating the link-supporting yokes and the devices for varying the position of the blocks in the links. Fig. 6 is a section on the line 6 6, Fig. 1, looking in the direction of the arrow. Fig. 7 is a section on the line 7 7 of Fig. 6. Fig. 8 is an elevation of one of the clutches. Fig. 9 is a section on the line 9 9 of Fig. 8 looking in the direction of the arrow. Fig. 10 is a longitudinal section of one of the clutches, and Fig. 11 is a transverse section on the line 11 11 of Fig. 10.

The present invention is particularly designed and intended for use in automobiles, although it is by no means limited to such use. In the following description and claims I have therefore particularly pointed out the various functions of my device, emphasizing their importance in connection with automobiles; but is is not intended that the claims should be limited to devices for use in connection with automobiles, as the device may be used in other connections, either in whole or in part, where the functions of the device are useful.

Broadly stated, my invention contemplates a driving member running at a uniform speed and a driven member adapted to be rotated in either direction and at any speed within the desired limitations. My invention contemplates the use of a motor preferably provided with a governor, so that it shall have a uniform speed irrespective of the demands of the driven member for a greater or less amount of power. Interposed between the driving member connected with any suitable source of power and the driven member adapted to be driven at variable speed is my improved variable-speed power-transmitting device. It will be recognized by those skilled in the art that it is desirable in automobile construction to operate the engine at a constant speed and yet absolutely to determine the speed of the vehicle. By my improved power-transmitting device I am enabled absolutely to regulate the speed of the driven member to prevent it from running faster or slower than desired, to bring it to rest, and to hold it at rest, all without varying the speed of the driving member. In other words, by the use of my device the engine once started can run continuously without interruption, the vehicle can be started, propelled forward, stopped, reversed, stopped, and always held at the desired speed without danger of running away or rolling by gravity on grades. Thus the vehicle may be stopped while going up or down hill by bringing the speed of the driven member to zero, and the vehicle will be held there irrespective of the grade. It is also obvious that it is desirable that the driven member should be capable of being rotated at any desired speed—that is, that the speed of the vehicle may be regulated with precision and not be varied by large increments or decrements. It is obvious that many or all of these desirable qualities in a variable-speed power-transmitting device are useful in other connections than in automobile construction.

In the illustrated embodiment of my invention the driving-shaft 1 is driven from any suitable source of power and may be either the motor-shaft or a shaft driven from the motor. The driven shaft 2 is adapted to be driven from the driving-shaft through the means to be described at the desired speed in either direction. The eccentric-shaft 3 is driven from the driving-shaft through the gears 4 and 5. Upon the end of the driven shaft 2 is mounted the pinion 6, which meshes with the planetary pinion 7, mounted upon the spider 8, (see Figs. 6 and 7,) the planetary pinion in turn engaging the internal gear 9, carried by the gear 10, which is revolubly mounted upon the driven shaft 2 and meshes with the gear 11, secured to the eccentric-shaft 3. The spider 8 is secured to and mounted upon the variable-speed shaft 12, hereinafter for convenience called the "spider-shaft," which is driven from the eccentric-shaft at a variable speed, but preferably always in the same direction. The gear 9 is driven at a uniform speed and the spider 8 at a variable speed, with the result that the driven shaft 2 is driven at a variable speed in either the one or the other direction, depending upon the speed of the spider-shaft 12. Connections are provided between the eccentric-shaft 3 and the spider-shaft 12, by means of which the speed of the latter is accurately regulated. Assuming that the driving-shaft 1 rotates in the direction of the arrow 13, then the eccentric shaft 3 will rotate in the direction of the arrows 14 and the internal gear will be rotated in the direction of the arrows 15, and this rotation of the internal gear in the direction of the arrow 15 will tend to carry the spider-shaft in the same direction indicated by the arrow 17. The speed at which the spider-shaft will be rotated will depend upon the speed of the driven shaft. If the driven shaft be stationary, the spider-shaft will have a speed of rotation which for the sake of convenience I will call throughout this specification the "stationary" speed. When power is to be imparted to the driven shaft to cause the same to rotate in a forward direction, the speed of the spider-shaft must be reduced below the stationary speed. I have therefore provided means for controlling the speed of the spider-shaft, so as to compel it to rotate in the direction of the arrow 17 at such a speed as to secure the desired speed of the driven shaft. The proportions of the various gears illustrated in the accompanying drawings are such that by increasing the speed of the spider-shaft the speed of the driven shaft will be diminished until it comes to rest and then revolves in a reverse direction at a gradually-increasing speed until the maximum speed of the spider-shaft is reached, when the maximum reverse speed of the driven shaft will be attained. I have thus provided for reversing the direction of rotation of the driven shaft without reversing the direction of rotation of any of the shafts by which it is driven. Furthermore, it will be noted that the greater the forward speed of rotation of the driven shaft the less the speed of the spider-shaft, until at the maximum speed of the driven shaft the spider-shaft will come to rest. The connections between the eccentric-shaft 3 and the spider-shaft 12, by means of which I accomplish these results, will now be described.

Upon the eccentric-shaft 3 are mounted three eccentrics $18^a$, $18^b$, and $18^c$, which are arranged with their centers at one hundred and twenty degrees to each other. Eccentric-straps 19 are provided for each eccentric, each strap being pivoted to a slotted link 20, secured to yokes 21, pivoted in turn upon short shafts 22, mounted in bearings 23, supported by stands 24 and $24^a$, mounted upon any convenient portion of the frame supporting the apparatus. Each link 20 carries a sliding block 25, to which is pivoted a connecting-yoke 26, in turn pivoted at its opposite ends to the clutch members 27, loosely mounted upon the spider-shaft 12. Oscillations imparted to the links 20 by means of the eccentrics in turn impart oscillations to the clutch members 27. The amplitude of oscillation of the links 20 is constant. By moving the blocks 25 in the links 20 the amplitude of oscillation of the clutch members 27 may be varied. The blocks 25 are provided with means for moving them in the slotted links 20. These means consist of the screws 28, which are revolubly mounted at one end in the bearings 29 and at the other end in the bearings 30, supported from the stands 24 and $24^a$, a universal joint 31 being provided at the center of oscillation of the yoke 21. The screws 28 are provided with beveled pinions 32, which mesh with beveled gears 33, mounted upon the shaft 34, carried by the bearings 35 in the stands 24 and $24^a$. By turning the shaft 34 in one direction the amplitude of oscillation of the clutch members 27 can be increased or diminished from a maximum when the blocks 25 are at the upper ends of the links 20 to a minimum of zero when the blocks 25 are opposite the axis of the short shaft 22. The speed of the spider-shaft depends upon the amplitude of oscillation of the clutch members 27. As the amplitude increases the speed increases.

In order to prevent the spider-shaft from rotating at its stationary speed, I have provided a peculiar clutch between the clutch member 27 and the spider-shaft, which operates both to hold the spider-shaft from rotation faster than a given rate of speed determined by the position of the block in the link and to compel the spider-shaft 12 to rotate at a predetermined speed. Each of these clutches consists of two clutches adapted to operate in opposite directions. For convenience I will call one of these clutches the "forward" clutch and the other the "reverse" clutch, which names are indicative of which clutch is normally in operation during the forward and reverse movements of the driven shaft. Inasmuch as these two clutches operate in opposite directions, it is necessary that one of them should be held out of operation at certain times, as will be hereinafter explained.

Referring particularly to Figs. 8, 9, 10, and 11, the clutch member 27 is provided on its inner side with a clutching-surface 35*, consisting of a steel ring, preferably hardened, which is secured to the shell of the clutch member by the screws 36. Secured to the spider-shaft are the clutch members 38, hexagonal in general form and adapted to coöperate with six cylindrical rolls, springs 39 being provided to hold the rolls in proper position. The rolls 40 are members of the forward clutch and the rolls 41 are members of the reverse clutch, the springs 39 being secured to the clutch member 38 in a position acting normally to press the rolls 40 and 41 in opposite directions toward the positions which they assume when they act to clutch the clutch members 38 to the clutch members 27. The arrow 42 on Fig. 11 indicates the direction of oscillation of the clutch member 27, which corresponds to a forward movement of the clutch member 27, during which said clutch member, in a manner hereinafter pointed out, operates to compel or permit the spider-shaft 12 to rotate in the same direction. The means provided for throwing one of the clutches out of operation is connected with the forward clutch members 40 and consists of a series of fingers 43, mounted upon a collar 44, slidingly mounted upon the spider-shaft 12. The collar 44 is provided with grooves 45, which are engaged by a pin 46, passing through the spider-shaft 12. When longitudinal movement is imparted to the collar 44, said collar is caused to turn on the spider-shaft 12 because of the inclination of the groove 45 to the axis of the spider-shaft 12. The collar 44 is provided with a circumferential groove 47, into which the pins of the fork 48 project and by which the longitudinal movement of the collar is produced. The fork 48 is pivotally mounted upon a stud 49, projected upward from the stands 24ª. The opposite end of the fork 48 is provided with a pin, which engages the cam-groove 50 in the cam 51, mounted upon the eccentric-shaft 3. The cam 51 reciprocates the collar 44 so as to cause the fingers 43 to engage the forward clutch-rolls 40 at certain predetermined times to prevent them from clutching the clutch member 38 to the clutch member 27. The cam 51 is so timed with relation to the oscillations of the clutch member 27 that the fingers 43 hold the forward clutch-rolls 40 inoperative during all movements of the clutch member except the middle parts of its forward movements. In other words, the forward clutch is inoperative at all times except during the time its eccentric is in the middle of its working stroke, when it will clutch together the two clutch members 27 and 38, provided clutch member 27 tends to rotate faster than clutch member 38 when it is making its forward stroke. For instance, during the time the eccentric 18ª is making one-third of a revolution, during which its corresponding clutch member 27 is going forward, the forward clutch corresponding to the eccentric 18ª is operative and at no other time. It will be noted that the three forward clutches are successively operative during successive thirds of revolutions of the eccentric-shaft 3.

In order to make the operation of my device quite clear, I will now describe its operation in connection with forward, stationary, and reverse motions of the driven shaft, and particularly with relation to using the device upon automobiles. Let us assume that the vehicle is standing still on a level road. The engine having been started and the spider-shaft being driven at such a rate of speed that the driven shaft is stationary, let the speed-controlling shaft 34 then be turned by any suitable means to move the blocks 25 toward the axis of the shaft 22, when the amplitude of oscillations of the clutch members 27 will thereby be decreased, the forward clutches will reduce the speed of the spider-shaft, and as a consequence the driven shaft will begin to rotate and to propel the vehicle forward. It is to be noted that by providing screws for moving the blocks 25 the amplitude of oscillation of the clutch members 27 may be gradually increased or decreased and that in starting the vehicle the speed will gradually and smoothly increase. During forward motion of the vehicle the rotation of internal gear 9 tends to carry forward in the direction of the arrow 17 the spider-shaft 12, owing to the resistance to rotation offered by the pinion 6 upon the driven shaft, and each forward clutch will successively and through successive thirds of revolutions of the eccentric-shaft hold the spider-shaft from revolving faster than the speed of the clutch members 27 during their forward movements. This tendency of the spider-shaft to run ahead will at these times wedge the rolls 40 between the clutch members 38 and 27, and the speed of the spider-shaft will thereby be held from exceeding the speed of the clutch members 27. By moving the blocks 25 downward in the links 20 the speed of the vehicle will gradually increase until the blocks 25 reach the bottoms of said links 20, in which position the blocks coincide with the axis of the shafts 22, which is the axis of oscillations of the links 20, so that in this condition the spider-shaft will be held stationary and the driven shaft will be rotated at the maximum speed for which the apparatus is designed. The condition of the parts and their operation remains the same in running on a level and running uphill. As soon, however, as the vehicle begins to descend a grade the driven shaft will tend to rotate in the direction in which it was before driven—that is to say, in the direction of the arrows 16. Under these circumstances the spider-shaft 12 instead of tending to rotate in the direction of the arrow 17 will tend to rotate in the opposite direction. The forward clutches will therefore fail to clutch, as clutch members 38 tend to rotate in the direction opposite to that indicated by the arrow 42. The reverse clutches, however, will come into operation, the springs 39 forcing the reverse clutch-rolls 41 into position so that said rolls will be engaged between the clutch members 38 and 27, and the forward motion of the clutch members 27 will, through the medium of the reverse clutches, drive the spider-shaft in the forward direction. Inasmuch as the speed of the driven shaft 2 can be increased only by decreasing the speed of the spider-shaft, it is evident that as long as the blocks in the links 20 remain in the same position the speed of the spider-shaft and driven shaft will be constant. If the speed of the spider-shaft be increased, the reverse-clutches being all the time operative, the speed of the driven shaft will be decreased until finally it becomes zero, when the spider-shaft is rotating at what I have called its stationary speed, and the vehicle comes to rest. In this condition it will be noted that the driven shaft will be held stationary and that the vehicle is as positively held from motion, either by pushing or pulling, as if it were braked. This is also true if the vehicle be stopped going uphill, as well as going downhill, in the former case the forward clutches acting to prevent the natural tendency of the spider-shaft to rotate in the forward direction at a greater rate of speed than that compelled by the clutches and in the latter case—that is, standing still on a downgrade—the reverse-clutches acting to drive the spider-shaft at the correct speed to maintain the driven shaft stationary. It is therefore evident that in going forward on a level, upgrade, standing still on a level and on an upgrade, and backing downhill the conditions are the same—namely, with the forward clutches operating—and that in going reverse on a level, forward downhill, backing uphill, and standing still facing downgrade on a downgrade the conditions are alike—namely, with the reverse-clutches in operation.

It is to be noted that when the reverse-clutches are in operation the presence of the forward clutches is entirely immaterial, as they have at that time absolutely no effect upon the operation of the apparatus, and, conversely, the reverse-clutches are without effect when the forward clutches are in operation.

While I prefer to cause the spider-shaft to rotate always in the same direction, my invention contemplates a construction in which the spider-shaft is rotated either in the one or the other direction, as may be desired. Moreover, while I have described my apparatus as embodying a planetary-gearing system my invention is not limited thereto, as other gearing systems with suitable changes in speeds of the parts could readily be substituted therefor.

It is to be noted that in the construction illustrated in the drawings the major part of the power transmitted through my apparatus to the driven shaft is transmitted through what I have termed the "eccentric-shaft," while only a very minor part of such power is transmitted through the spider-shaft and the clutches. I consider this the most desirable arrangement, as it relieves the clutches of the duty of transmitting large amounts of power and it relieves them of the stresses and strains incidental thereto. My invention, however, in its broader aspects is not limited to such division of the power into parts which are applied to the driving-shaft through different channels, but contemplates, broadly, the use of a system of gearing and a system of clutches constructed and arranged to transmit power to a driven shaft at variable speeds and in either direction. Furthermore, it is to be noted that my device is by no means limited to use in automobiles, but is capable of being used in various places where the power consumed must be applied either in the forward or reverse direction and at a variable speed, determinable at the will of the operator.

In some of the accompanying claims I have used the expression "clutch-driving shaft" and "power-shaft" to designate the shaft which throughout the specification I have termed the "eccentric-shaft," and by such term I intend to define a driving member operating to drive the clutches. I have also used the expression "clutch-shaft" to designate what I have termed in this specification the "spider-shaft," and I intend thereby to define a member rotated or permitted to rotate by the clutches and connected with a member on the gearing by which the driven member is actuated.

It is to be noted that the clutch-shaft might be directly connected with the apparatus desired to be driven and in automobile constructions might be directly connected with the gearing for driving the vehicle-wheels and that for the purpose of obtaining reverse rotation of the vehicle-wheels a reversing-gear could be employed in connection therewith.

Having thus described my invention, I claim—

1. A variable-speed power-transmitting device, having, in combination, a clutch-shaft, a series of double-acting clutches mounted on said shaft, a clutch driving-shaft and means actuated by said shaft for preventing the operation of the clutches in one direction, substantially as described.

2. A variable-speed power-transmitting device, having, in combination, a series of double-acting clutches, said clutches comprising two clutch members and a plurality of rolls arranged to lock said members together, fingers arranged to engage one set of rolls to prevent the locking of the two clutch members together and means for intermittently actuating said fingers, substantially as described.

3. A variable-speed power-transmitting device, having, in combination, a driven shaft, a driving-shaft, an eccentric-shaft, a clutch-shaft, gears connecting the eccentric-shaft with the driving-shaft, planetary gearing between the eccentric-shaft and the clutch-shaft and the driven shaft, clutches on the clutch-shaft, slotted links carrying blocks connected with the clutches, and eccentrics on the eccentric-shaft connected with the slotted links, substantially as described.

4. A variable-speed power-transmitting device, having, in combination, a clutch-shaft, a series of clutches on said shaft comprising clutch members loosely mounted upon said shaft, connecting members, and clutch members secured to said shaft, means for actuating the loosely-mounted clutch members, and automatic means for intermittently preventing the clutches from operating during successive aliquot parts of a revolution of the clutch-shaft, substantially as described.

5. A variable-speed power-transmitting device, having, in combination, a clutch-shaft, a series of intermittently-acting oscillating clutches thereon, a clutch driving-shaft, connections between the clutches and the clutch driving-shaft, and automatic means for rendering the clutches inoperative, the clutches acting to operatively connect the clutch-shaft and the clutch driving-shaft while the clutches are oscillating in the direction of rotation of the clutch-shaft and to fix the ratio of speeds of the said shafts, and the said automatic means acting to disconnect the clutches from the clutch-shaft during the reverse oscillation of the clutches, substantially as described.

6. A variable-speed power-transmitting device, having, in combination, a driven shaft, a driving-shaft, a clutch-shaft, a clutch driving-shaft, gearing connecting the clutch driving-shaft with the driving-shaft, gearing connecting the clutch-shaft and the driven shaft, the clutch-shaft comprising a variable-speed member, and connections between the clutch driving-shaft and the clutch-shaft acting to control the speed of the clutch-shaft, substantially as described.

7. A variable-speed power-transmitting device, having, in combination, a driven shaft, a driving-shaft, a clutch driving-shaft, a clutch-shaft, gearing connecting the driving-shaft with the clutch driving-shaft, gearing connecting the clutch driving-shaft and the clutch-shaft with the driven shaft comprising a variable-speed member connected to the clutch-shaft, oscillating clutches on the clutch-shaft and connections between the clutch driving-shaft and the clutches acting to impart oscillations of various amplitude to the clutches on the clutch-shaft, substantially as described.

8. A variable-speed power-transmitting device, having, in combination, a driven shaft, a power-shaft, gearing between the driven shaft and power-shaft including a clutch-shaft, double-acting clutches on said clutch-shaft and connections between the power-shaft and clutch-shaft acting to prevent the clutch-shaft from rotating faster than a given determined rate of speed or to drive said clutch-shaft, substantially as described.

9. A variable-speed power-transmitting device, having, in combination, a driven shaft, a power-shaft, gearing between the driven shaft and power-shaft including a clutch-shaft, double-acting clutches mounted on said shaft, and means for rendering one set of said clutches inoperative at all times except a certain portion of their strokes, substantially as described.

10. A variable-speed power-transmitting device, having, in combination, a driven shaft, a power-shaft, gearing between the driven shaft and power-shaft including a clutch-shaft, a series of forward and reverse clutches mounted on said clutch-shaft comprising clutch members fixed to the clutch-shaft and oscillating clutch members loosely mounted upon said clutch-shaft, means connecting said oscillating clutch members with the power-shaft and for varying the amplitude of oscillation of said clutch members, and means for rendering the forward clutches inoperative at all times except during the middle part of the forward motion of said clutch members, substantially as described.

11. A variable-speed power-transmitting device, having, in combination, a driven shaft, an internal gear loosely mounted upon the driven shaft, means for rotating said internal gear at a uniform rate of speed, a gear mounted upon and secured to the driven shaft and a pinion interposed between said internal gear and said fixed gear, and a series of double-acting clutches for regulating the speed of revolution of said pinion about the axis of the driven shaft, substantially as described.

12. A variable-speed power-transmitting device, having, in combination, a driven shaft, a gear mounted upon and fixed to said shaft, an internal gear revolubly mounted upon said shaft, a pinion meshing with said fixed gear and internal gear, means for rotating the internal gear at a constant speed, means permitting or compelling the pinion to revolve about the fixed gear in one direction and at a variable speed, said means comprising a shaft, a series of double-acting clutches mounted thereon, means for actuating said clutches and means for rendering one set of said clutches inoperative at all times except aliquot portions of the revolution of the pinion about the fixed gear, substantially as described.

13. A variable-speed power-transmitting device, having, in combination, a driven shaft, a gear fixed thereon, a pinion mounted to revolve about the axis of said driven shaft, an internal gear adapted to engage the pinion, means for rotating the internal gear at a constant speed, means for revolving the pinion at a variable speed comprising a series of oscillating double-acting clutches, means for holding one set of said clutches inoperative successively for aliquot portions of a revolution of said pinion about the axis of the driven gear, and means for actuating the clutches having provision for varying the amplitude of oscillation of said clutches, substantially as described.

14. A variable-speed power-transmitting device, having, in combination, a driven shaft, clutches, and means for actuating them, said clutches acting intermittently to positively determine at all times the speed and direction of rotation of the driven shaft, substantially as described.

15. A variable-speed power-transmitting device, having, in combination, a power-shaft rotating in one direction and at a constant speed, an intermediate shaft rotating in one direction, means connecting the power-shaft and the intermediate shaft acting to transmit power to or from the latter and to vary the speed of the intermediate shaft or to hold it from rotation, a driven shaft, and connections between the intermediate and the driven and the power shafts acting to drive the driven shaft in either direction and at a variable speed, substantially as described.

16. A variable-speed power-transmitting device, having, in combination, a driving-shaft, a driven shaft, and a plurality of oscillating clutches actuated by the driving-shaft, one of said clutches being operatively connected with the driven shaft at all times, and acting to determine the speed ratio of the said shafts, substantially as described.

17. A variable-speed power-transmitting device, having, in combination, a driving-shaft, a driven shaft, and a plurality of oscillating clutches actuated by the driving-shaft, one of said clutches being always operatively connected with the driven shaft, said clutches acting simultaneously to cause the driven shaft to rotate and to limit its speed of rotation, substantially as described.

18. A variable-speed power-transmitting device, having, in combination, a driving-shaft, a driven shaft, and a plurality of oscillating double-acting clutches actuated by the driving-shaft, one of said clutches being always operatively connected with the driven shaft and acting to determine the speed ratio of the said shafts, substantially as described.

19. A variable-speed power-transmitting device, having, in combination, a driving-shaft, a driven shaft, and a series of oscillating successively-acting double-acting clutches actuated by the driving-shaft, one of said clutches being always operatively connected with the driven shaft, and acting to determine the speed ratio of the said shafts, substantially as described.

20. A variable-speed power-transmitting device, having, in combination, a clutch driving-shaft, a driven shaft, gearing connecting the driving-shaft and driven shaft, and a series of oscillating double-acting clutches connected with the driven shaft and actuated by the driving-shaft operative through variable arcs to vary the speed of the driven shaft, substantially as described.

21. A variable-speed power-transmitting device, having, in combination, a clutch-shaft normally tending to rotate, forward clutches mounted thereon acting intermittently and successively to prevent the clutch-shaft from rotating forwardly faster than a given speed, and means for actuating the clutches, substantially as described.

22. A variable-speed power-transmitting device, having, in combination, a clutch-shaft normally tending to rotate, forward clutches mounted thereon acting intermittently and successively to prevent the clutch-shaft from rotating forwardly faster than a given speed, reverse clutches mounted thereon acting to prevent the clutch-shaft from rotating slower than the given speed, and means for actuating the clutches, substantially as described.

23. A variable-speed power-transmitting device, having, in combination, a driving-shaft, a driven shaft, gearing between the driving-shaft and the driven shaft, and unyielding variable-speed power connections between the driving-shaft and the driven shaft, acting in connection with said gearing to vary the speed of the driven shaft progressively in either direction from zero to a maximum, substantially as described.

24. A variable-speed power-transmitting device, having, in combination, a driving-shaft, a driven shaft, toothed gearing between the said shafts, and variable-speed power connections between the shafts serving to transmit power without lost motion between the shafts and to vary their relative speed and direction of rotation progressively, substantially as described.

25. A variable-speed power-transmitting device, having, in combination, a driving-shaft, a driven shaft, toothed gearing between the driving-shaft and driven shaft, and positively-acting oscillating clutches connected with the driving-shaft and driven shaft acting to determine the speed of the driven shaft, substantially as described.

26. A variable-speed power-transmitting device, having, in combination, a driving-shaft, a driven shaft, toothed gearing between the driving-shaft and driven shaft including a variable-speed member, and means for positively rotating the variable-speed member, in one direction only, from zero to a maximum, acting in connection with said toothed gearing to rotate the driven shaft in either direction and at any desired speed, substantially as described.

27. A variable-speed power-transmitting device, having, in combination, a driven shaft, a driving-shaft, an eccentric-shaft, a clutch-shaft, gears connecting the eccentric-shaft with the driving-shaft, planetary gearing between the eccentric-shaft and the clutch-shaft and the driven shaft, clutches on the clutch-shaft, eccentrics on the eccentric-shaft, and connections between the eccentrics and the clutches acting to vary the throw of the clutches, substantially as described.

28. A variable-speed power-transmitting device, having, in combination, a driven shaft, a driving-shaft, a clutch driving-shaft, a clutch-shaft, gears connecting the clutch driving-shaft with the driving-shaft, planetary gearing between the clutch driving-shaft and the clutch-shaft and the driven shaft, clutches on the clutch-shaft, and mechanism for actuating the clutches from the clutch driving-shaft having provision for varying the throw of the clutches, substantially as described.

29. A variable-speed power-transmitting device, having, in combination, a clutch-shaft, means normally tending to rotate said shaft in one direction, a series of double-acting clutches connected with the clutch-shaft acting to vary the speed of the said shaft, and means for actuating said clutches, substantially as described.

30. A variable-speed power-transmitting device, having, in combination, a clutch-shaft, controllable means normally tending to rotate said shaft in one direction, a series of successively-acting clutches and means for actuating them acting to control the rate of speed of the clutch-shaft, substantially as described.

31. A variable-speed power-transmitting device, having, in combination, a driven shaft, an eccentric-shaft and means for rotating it, a clutch-shaft, a series of forward clutches mounted thereon, a series of reverse clutches mounted thereon, eccentric-straps on the eccentric-shaft connected with the clutches and adjusting mechanism for regulating the throw of the clutches, substantially as described.

32. A variable-speed power-transmitting device, having, in combination, a clutch-shaft, forward clutches mounted thereon, reverse clutches mounted thereon, automatic means for preventing the forward clutches from operating and means for actuating the clutch members, substantially as described.

33. A variable-speed power-transmitting device, having, in combination, a clutch-shaft, a clutch mounted thereon comprising a member fixed to the clutch-shaft, a connecting member, and a member revolubly mounted upon the clutch-shaft, and automatically-operated means for rendering the connecting member operative during a portion of the forward stroke of the revolubly-mounted clutch member, and means for oscillating the clutch member, substantially as described.

34. A variable-speed power-transmitting device, having, in combination, a driven shaft, a gear mounted upon and fixed to said shaft, an internal gear revolubly mounted upon said driven shaft, a pinion engaging said fixed gear and internal gear, means for rotating the internal gear at a constant speed, means for positively regulating and compelling the pinion to revolve at any desired speed from zero to a maximum, substantially as described.

35. A variable-speed power-transmitting device, having, in combination, a driven shaft, a driving-shaft, positive-motion power connections between the driving-shaft and driven shaft, and positive-motion variable-speed power connections between the driving-shaft and the driven shaft, including forward clutches and reverse clutches, acting in connection with said power connections to drive the driven shaft, said clutches being constructed so that one set of clutches, as the forward clutches or reverse clutches, shall be automatically rendered inoperative when the other set is operative, substantially as described.

36. A variable-speed power-transmitting device, having, in combination, a driving-shaft, a driven shaft, and positive-motion power connections between the driving-shaft and the driven shaft, including a plurality of driving and retarding clutches, acting automatically so that at all times at least one driving and one retarding clutch is operative, substantially as described.

37. A variable-speed power-transmitting device, having, in combination, a driving-shaft, a driven shaft, positive-motion power connections between the driving-shaft and the driven shaft, including forward clutches and reverse clutches, the forward clutches being automatically thrown into operation during forward rotation of the driven shaft against resistance and the reverse clutches being automatically thrown into operation during forward motion of the driven shaft against no resistance and during reverse motion of the driven shaft against resistance, substantially as described.

38. A variable-speed power-transmitting device, having, in combination, a driving-shaft, a driven shaft, a variable-speed shaft, a differential gearing having elements rotatably connected with the said shafts, means for preventing the variable-speed shaft from rotating faster than a determined speed ratio with respect to the driving-shaft, and a series of intermittently-acting driving-clutches, actuated by connection with the driving-shaft, for causing rotation of the variable-speed shaft, substantially as described.

39. A variable-speed power-transmitting device, having, in combination, a clutch driving-shaft, a driven shaft, toothed gearing between the driving-shaft and the driven shaft, serving to transmit the power from the driving-shaft to the driven shaft during the rotation of the driven shaft in one direction, and a positively-acting variable-speed power-transmitting device comprising intermittently-acting clutches between the driving-shaft and the driven shaft, serving to transmit the power from the driving-shaft to the driven shaft during the rotation of the driven shaft in the opposite direction, said variable-speed device acting to determine the speed of the driven shaft and its direction of rotation, substantially as described.

40. A variable-speed power-transmitting device, having, in combination, a clutch-shaft, a clutch mounted thereon comprising a member fixed to the clutch-shaft, a connecting member, and a member revolubly mounted upon the clutch-shaft, means for oscillating the revolubly-mounted clutch member, and means automatically operated for rendering the connecting member alternately operative and inoperative during successive strokes of the revolubly-mounted clutch member, substantially as described.

41. A variable-speed power-transmitting device comprising a variable-speed shaft, a driving-shaft, driving-clutches by means of which the driving-shaft drives the variable-speed shaft, and retarding-clutches tending to retard the variable-speed shaft and accelerate the driving-shaft, and means automatically operated for causing the retarding-clutches to act only while rotating in the same direction as the variable-speed shaft, substantially as described.

42. A variable-speed power-transmitting device, having, in combination, a driving-shaft, a driven shaft, a differential gearing of which two elements are connected with the said shafts respectively, and connections between the third element of the said gearing and the driving-shaft comprising oscillating variable-throw clutches, substantially as described.

43. A variable-speed power-transmitting device, having, in combination, a clutch driving-shaft, a clutch-controlled shaft, an oscillating clutch arranged to prevent the clutch-controlled shaft rotating faster than the oscillation of the clutch, and automatic means for rendering the clutch inoperative while oscillating in the direction opposite to the rotation of the clutch-controlled shaft, substantially as described.

44. A variable-speed power-transmitting device, having, in combination, a clutch-controlled shaft, an oscillating clutch arranged to prevent relative rotation of the clutch and the clutch-controlled shaft in either direction, and automatic means for releasing the clutch from the clutch-controlled shaft during oscillations in one direction, substantially as described.

45. A variable-speed power-transmitting device, having, in combination, a clutch driving-shaft, a clutch-controlled shaft, a series of oscillating double-acting clutches mounted on the latter and actuated by the former, the said clutches being provided with driving elements and retarding elements, one of each of which is always in action, and automatic means for rendering inoperative the retarding elements during reverse oscillations of the clutches, substantially as described.

46. A variable-speed power-transmitting device, having, in combination, a driving-shaft, a driven shaft, a differential gearing of which two elements are connected with the said shafts respectively, and connections between the third element of the said gearing and the driving-shaft comprising oscillating clutches for driving the said element and means for retarding the same, substantially as described.

47. A variable-speed power-transmitting device, having, in combination, a driving-shaft, a driven shaft, a differential gearing of which two elements are connected with the said shafts, respectively, and connections between the third element of the said gearing and the driving-shaft comprising double-acting oscillating clutches, means for varying the throw of the said clutches, and automatic means for interrupting the action of the clutches during reverse oscillations, substantially as described.

48. A variable-speed power-transmitting device, having, in combination, a clutch driving-shaft connected with a source of power, an internal gear rotatively connected with the same, planet-gears engaging the internal gear, a driven gear engaging the planet-gears, a spider carrying the planet-gears, a clutch-shaft to which the spider is rotatively connected, oscillating clutches for rotating the clutch-shaft, and variable-throw mechanism connected with the clutch driving-shaft and the clutches for operating the latter, substantially as described.

49. A variable-speed power-transmitting device, having, in combination, a driving-shaft, a driven shaft, a variable-speed shaft, a differential gearing having elements rotatably connected with the said shafts, positively-actuated variable-speed members actuated by the driving-shaft and frictional means for rotatively connecting the variable-speed members with the intermediate shaft, substantially as described.

In testimony whereof I affix my signature in presence of two witnesses.

ALFRED B. FOWLER.

Witnesses:
 ALFRED H. HILDRETH,
 FRED O. FISH.